United States Patent
Terpstra et al.

(10) Patent No.: US 6,261,510 B1
(45) Date of Patent: Jul. 17, 2001

(54) METHOD FOR PRODUCING HOLLOW FIBROUS MEMBRANES FOR MICROFILTRATION, ULTRAFILTRATION OR GAS SEPARATION

(75) Inventors: Rinse Alle Terpstra, Geldrop; Joost Petrus Gerardus Maria Van Eijk, Berkel-Enschot, both of (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 0 days.

(21) Appl. No.: 09/331,954
(22) PCT Filed: Nov. 5, 1998
(86) PCT No.: PCT/NL98/00639
  § 371 Date: Jun. 30, 1999
  § 102(e) Date: Jun. 30, 1999
(87) PCT Pub. No.: WO99/22852
  PCT Pub. Date: May 14, 1999

(30) Foreign Application Priority Data

Nov. 5, 1997 (NL) .................................. 1007456

(51) Int. Cl.[7] .................................................. B28B 3/20
(52) U.S. Cl. ........................................ 264/628; 264/634
(58) Field of Search ................................... 264/628, 634

(56) References Cited

U.S. PATENT DOCUMENTS

| 4,329,157 | 5/1982 | Dobo et al. ............................... 55/16 |
| 4,935,199 | 6/1990 | Nishio et al. ........................... 419/36 |

FOREIGN PATENT DOCUMENTS

| 29 19 510 | 11/1979 | (DE) . |
| 197 01 751 | 7/1997 | (DE) . |
| 0 047 640 | 3/1982 | (EP) . |
| 2 736 843 | 1/1997 | (FR) . |
| WO 91/05601 | 5/1991 | (WO) . |

*Primary Examiner*—Christopher A. Fiorilla
(74) *Attorney, Agent, or Firm*—Young & Thompson

(57) ABSTRACT

A method for producing hollow fibrous membranes includes the steps of mixing a ceramic powder with a binder to form a paste having a sufficient viscosity to be extruded without heating, characterized in that said binder is a binder dissolved in water or another simple solvent or a thermosetting binder or an inorganic binder or a combination of said binders; extruding the paste to the form of hollow fibers by means of a spinneret; supporting the hollow fibers leaving the spinneret on a roller conveyor comprising a pair of rollers which rotate in opposite directions away from each other where the fibers contact the rollers; and sintering the hollow fibers. These membranes are used for microfiltration, ultrafiltration or gas separation. The fibrous membranes have an external diameter of 0.1–3 mm and a wall thickness of 10–500 μm.

1 Claim, 2 Drawing Sheets

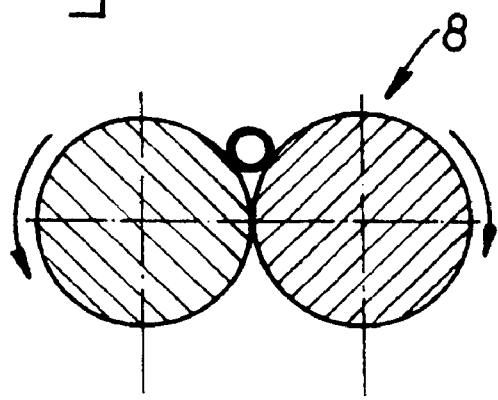

METHOD FOR PRODUCING HOLLOW FIBROUS MEMBRANES FOR MICROFILTRATION, ULTRAFILTRATION OR GAS SEPARATION

FIELD OF THE INVENTION

The invention relates to a method for producing hollow fibrous membranes for microfiltration, ultrafiltration or gas separation, which fibrous membranes have an external diameter of 0.1–3 mm and a wall thickness of 10–500 μm, in which method a ceramic powder is mixed with a binder, the paste formed has sufficient viscosity to be extruded without heating, the paste formed is extruded to form hollow fibres by means of a spinneret and the powder particles are sintered to one another to obtain ceramic hollow fibres.

Such a method is described in EP-B-0693961.

BACKGROUND OF THE INVENTION

The use of membrane technology in industrial processes is increasing; continuous processing, relatively mild conditions and appreciable reduction of energy consumption are the greatest advantages compared with conventional separation processes.

At present, polymeric (plastic) membranes, in particular, are used. However, these have the disadvantage of a low chemical and thermal stability, a low erosion resistance and an unduly low rigidity, as a result of which they can be compressed and the properties may vary.

Ceramic membranes offer a solution to this. The present generation of commercially obtainable ceramic membranes is still too expensive and has a low ratio of the membrane surface per unit volume. The method described in EP-B-0693961 deals with this. Use is made of a thermoplastic binder. As a result of a relatively simple processing, the cost price of the microfiltration hollow fibrous membranes is a factor of 3 to 10 lower than that of the present generation of ceramic membranes, while the surface/volume ratio, at more than 1000 $m^2/m^3$, is up to 10 times higher. The abovementioned method for making ceramic membrane fibres is eminently suitable for producing the fibres on an industrial scale.

OBJECT OF THE INVENTION

The object of the invention is to improve the method referred to in the introduction, as a result of which the product, ceramic fibrous membranes, can be produced more cheaply on an industrial scale.

SUMMARY OF THE INVENTION

According to the invention, the method mentioned in the introduction is characterized for this purpose in that a binder dissolved in water or another simple solvent or a thermosetting binder or an inorganic binder or a combination of said binders is used.

If a binder dissolved in water or another simple solvent is present, the paste formed will have to lose at least some of the water from the fibres as a result of evaporation caused by drying, at a temperature of at most 40° C., immediately after the extrusion process, but prior to the sintering, as a result of which the binder is gelated and the fibre rapidly acquires rigidity. Compared with EP-B-0693961, a lesser amount of raw materials is needed and the step in which the binder composed of a thermoplastic polymer has to be removed in a separate furnace at approximately 500° C. is unnecessary. The respective furnace is also no longer necessary. The relatively small amount of binder dissolved in water or another simple solvent can easily be removed during the sintering.

In general, only a few per cent of a binder composed, for example, of methylcellulose are needed to make the viscosity of the mixture of ceramic powder, water or a water-soluble binder great enough for said mixture to be capable of being extruded by means of a spinneret to form a hollow fibre.

As a result of evaporation of the water at room temperature or a somewhat higher temperature, the binder will be formed into a gel.

If a thermosetting binder is used, the binder will, however, be removed in a separate furnace at approximately 500° C. Thermosets become hard when heated as a consequence of crosslinking reactions In the cured state, they are no longer fusible, nor are they soluble, but at most swellable. In contrast to thermoplastic binders, the thermoset does not have to be cooled but can be cured, for example, by:

absorption of oxygen without the production of water or gases, such as epoxy polymers;

by increase in temperature, such as, for example, in the case of phenol formaldehyde;

by adding a small amount of catalyst, less than 1% by weight, usually a peroxide (such as, for example, methyl ethyl ketone peroxide), such as, for example, in the case of polyesters or allyls (diallylphthalate or diallylisophthalate).

If thermosets are used, approximately the same amount of raw materials is needed, but the strength of the green product will become greater during baking because the binder no longer becomes plastic. It is then also possible to use powders which have a different morphology.

If inorganic binders are used, use is mainly used of heteropolymers and hybrid heteropolymers. Heteropolymers are polymers having more than one type of atom in the main chain, such as, for example, silicates or siloxanes. Hybrid heteropolymers are polymers having inorganic atoms and having organic units, an example being ethene/silane copolymer. Inorganic binders can be cured by, for example:

carbon dioxide or an organic ester (for example, glycerol diacetate) in the case of inorganic silicates or adding peroxide in the case of silanes or siloxanes.

Inorganic silicates have the advantage compared with the prior art (EP-B-0693961) that a smaller amount of raw materials is necessary and that the step in which binder has to be removed in a separate furnace at approximately 500° C. can be omitted. The furnace which is used for that purpose can also be eliminated. The inorganic residue which remains behind can be used to increase the rigidity of the membrane or to control the properties of the hollow fibrous membrane within a certain range. A lower sintering temperature can also be used and a relatively cheaper atmospheric furnace can be used for the nonoxidic membranes.

In order to prevent collapse of the fibres under all circumstances, they should be capable of being collected on a roller conveyor comprising a pair of rollers rotating in opposite directions.

BRIEF DESCRIPTION OF THE INVENTION

The invention will now be explained in greater detail by reference to the figures. In this case, use is made of a binder dissolved in water or another simple solvent.

FIG. 3 shows a section along the line III—III in FIG. 2.

Figure 1:
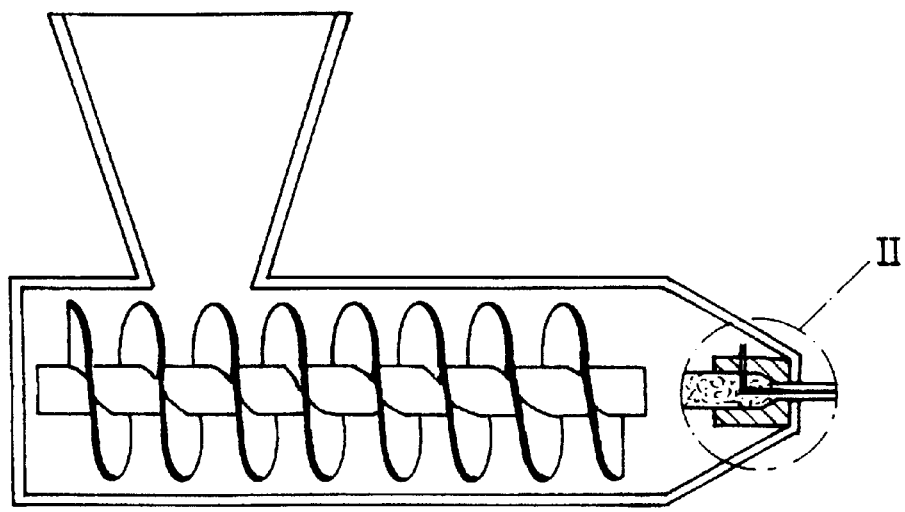
FIG. 1 shows a schematic side view of the device used.

In an extrusion press 1, a paste composed of ceramic powder and a binder dissolved in water is fed by means of the screw 2 into a spinneret 3. A gas tank 4 feeds gas via a reducing valve 5 into a pipe 6 which terminates centrally in the spinneret 3. The gas jet ensures that the extruded hollow fibres remain open and are cooled. To prevent collapse, the hollow fibres are supported on their way to the sintering furnace 7 by a driven roller conveyor 8 comprising, at the position of the hollow fibres, mutually counterrotating rollers.

During transport to the sintering furnace 7, drying of the fibres takes place at room temperature or at an elevated temperature. During this process, the binder will be subjected to gelation. The curing during a limited time of the hollow fibres formed as a result of gelation of the binder is necessary to prevent the fibres collapsing and to be able to feed them undamaged into the sintering furnace.

In the sintering furnace, sintering of the ceramic particles takes place. In the case of aluminium oxide, the sintering furnace temperature is approximately 1300° C. and in the case of silicon nitride powder, the sintering temperature is approximately 1600° C.

EXAMPLE

In this example, submicron $\alpha\text{-}Al_2O_3$ is used as the ceramic powder and the binder used is methylcellulose in water.

Figure 2:
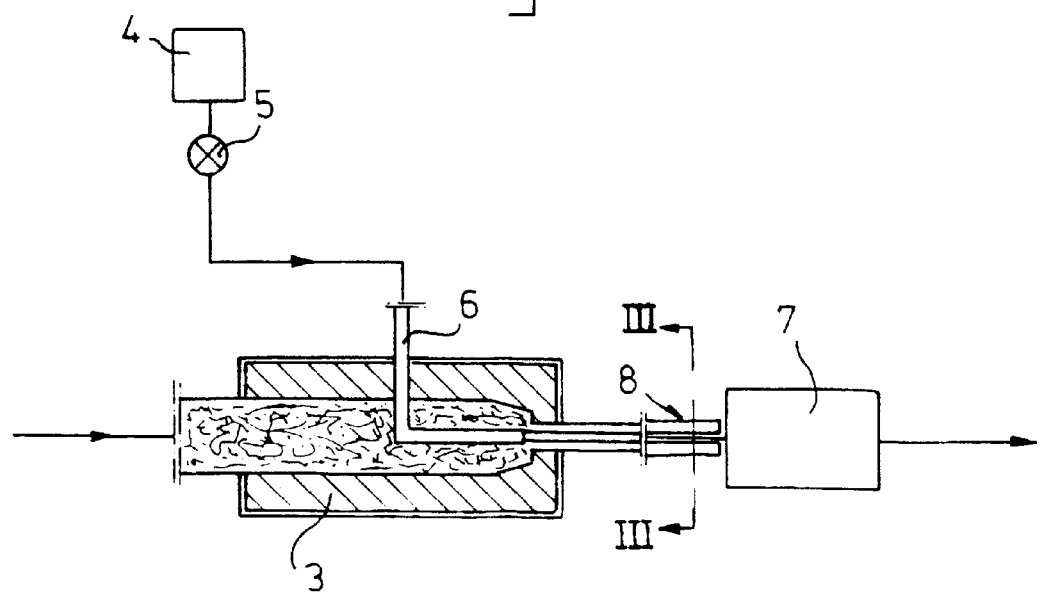
FIG. 2 shows, on a larger scale, the portion that is indicated by a broken rectangle in FIG. 1.

The $\alpha\text{-}Al_2O_3$ powder is mixed, in the dry state, with 3.5% by weight of methylcellulose in a PE flask. 23.3% by weight of water, in which 2.6% by weight of binder (Zusoplast, produced by Zschimmer & Schwarz) is dissolved, is added to this mixture using a sprinkler. The granules obtained above are extruded, with the aid of a single-screw extruder, using the spinneret as shown in FIG. 2, at 35° C., to give a hollow fibrous membrane with an external diameter of 3 mm and an internal diameter of 2 mm. The hollow fibrous membrane is cut off at a length of approx. 50 cm. The hollow fibre is dried at room temperature and then sintered at 1300° C. This results in a hollow fibrous membrane with an external diameter of 2.4 mm and an internal diameter of 1.6 mm and with a porosity of 35% and a mean pore diameter of approx. 0.18 $\mu$m.

What is claimed is:

1. A method for producing hollow fibrous membranes for microfiltration, ultrafiltration or gas separation, which fibrous membranes have an external diameter of 0.1–3 mm and a wall thickness of 10–500 $\mu$m, comprising:

mixing a ceramic powder with a binder to form a paste having a sufficient viscosity to be extruded without heating, characterized in that said binder is a binder dissolved in water or another simple solvent or a thermosetting binder or an inorganic binder or a combination of said binders;

extruding the paste to the form of hollow fibers by means of a spinneret;

supporting the hollow fibers leaving the spinneret on a roller conveyor comprising a pair of rollers which rotate in opposite directions away from each other where the fibers contact the rollers; and sintering the hollow fibers.

* * * * *